ମ3,110,566
METHOD OF REMOVING ARSENICAL COMPOUNDS CONTAINED IN SULPHUR
Giuseppe Giammarco, Porto Marghera, Venice, Italy, assignor to Vetrocoke Societa per Azioni, Porto Marghera, Venice, Italy
No Drawing. Filed Mar. 27, 1962, Ser. No. 182,963
Claims priority, application Italy Apr. 4, 1961
6 Claims. (Cl. 23—225)

In desuphuretting gaseous mixtures by so-called oxidative methods hydrogen sulphide contained in a gaseous mixture is chemically absorbed by means of a suitable aqueous absorbing solution, sulphur being precipitated in an elemental state at a regeneration step for the solution and being recovered by filtering or other equivalent process.

The result is a paste comprising at least 50% sulphur in a finely subdivided condition and not over 50% water, apart from impurities. This paste is usually brought into an autoclave and heated to 130–150° C. at superatmospheric pressure, sulphur melting and separating from water through the different densities of the two liquids.

Among the various oxidative processes certain of them employ aqueous absorbing solutions containing arsenical compounds. A process of this class is described, for instance, in U.S.A. Patent No. 2,993,910 to applicants and a further process is known in the branch under the name of Thylox process. Sulphur recovered by these methods is impure by arsenic, which prevents use thereof in the manufacture of sulphuric acid.

Attempts at removing arsenical impurities by washing the sulphur paste by means of water or solutions of alkali metal hydroxides or carbonates were not industrially successful. This is all the more unexpected as arsenical impurities adhere to the surface only of the sulphur particles in the paste, as was disclosed by extensive research work, and should therefore have been removed by the abovementioned washing processes.

It has now been found that arsenical impurities generally comprising sulphuretted arsenical compounds of alkali metals and/or arsenites or arsenates of alkali metals can be successfully eliminated by heating and melting the sulphur paste in the presence of a suitable proportion of given solid substances having absorbing properties or chemically reacting with the said impurities, thereby yielding a slag which can be separated by filtering, centrifuging or other suitable process.

A number of solid substances are available, which are capable of affording satisfactory results. However, the best results were obtained by the use of the following substances: ferric hydroxide, ferrous hydroxide, calcium hydroxide, magnesium hydroxide, silica gel and decolorating earths. These substances can be employed alone or jointly.

Not all these substances are of equivalent properties. For instance, the use of iron hydroxides is more particularly convenient in connection with sulphur pastes from absorption of hydrogen sulphide by aqueous solutions containing, as an active component an alkali metal arsenite or arsenate, generally sodium or potassium arsenite or arsenate, and wherein absorption of hydrogen sulphide has been carried out only to the stage of formation of mono-thio-arsenate ($Na_3AsO_3S$ or $K_3AsO_3S$). However, when hydrogen sulphide was absorbed more thoroughly, whereby multisulphuretted compounds were formed, or when the absorption process (such as the Thylox process) was carried out so as to yield such compounds only it was found more convenient to employ calcium or magnesium hydroxides or silica gel or decolorating earths, preferably in the form of mixtures including both the latter and hydroxide.

The abovementioned purifying substances are added in a finely subdivided condition to the sulphur paste, the paste activated by such addition being homogenized in a mixer. The paste is then transferred to a suitable melting pan for heating and melting it. Melting apparatus known per se are preferably employed which comprise a filtering basket suspended in a heated container, such apparatus being preferred the filtering basket of which can be rotated at a centrifuging rate of speed.

The temperature within the melting apparatus is gradually brought to about 135–145° C. and maintained at this level till the end of the process. At first the paste contained in the basket gives off water which drips from the basket and is preferably removed from the apparatus. Subsequently, sulphur melts and drips from the basket either by gravity or centrifugal force, the slags remaining in the basket. The walls and bottom of the latter are preferably made of a wire gauze with 16 to 20 meshes/sq. cm. However, it is possible to employ a closer wire gauze when separation of sulphur from the slags is effected by centrifuging.

A small proportion of molten sulphur is left in the slags. In order to minimize such proportion it would be sufficient to increase somewhat temperature without, however, reaching the temperature (150° to 160° C.) at which the molten sulphur starts rising in viscosity, unless the subsequent separation of molten sulphur is effected by centrifuging.

The slags also retain various impurities other than arsenical compounds, such as, for instance, tarry substances. Moreover, when the sulphur paste has been obtained by a method such as described in U.S.A. Patent No. 2,932,021, which employs catalysts of the phenol class (hydroquinones, quinones, pyrocatechin) the slags also retain particles of such catalysts. It was even ascertained that the particles of said catalysts appreciably contribute towards removal of arsenical impurities by the instant method, by acting, apparently at least, as an anchor between the impurities and slags.

The proportion of purifying substances to be added to the sulphur paste mainly depends upon the quantity of arsenic in the paste, and subordinately only upon the form in which arsenic is present (arsenite, arsenate, etc.). Generally, a satisfactory separation is obtained by proportions ranging between 1 and 20 parts by weight of purifying substances to 1 part As. This range is not a particularly critical one; however, it was ascertained that lower proportions quickly lead to a worse rate of purification.

In carrying out the invention it should be considered that the sulphur paste may contain per se a small proportion of iron hydroxides deriving from corrosion of the equipments in which hydrogen sulphide is absorbed by gaseous mixtures. This proportion is never sufficient to eliminate arsenical impurities from the resulting sulphur paste; however, it should be considered in proportioning the additions of purifying substances so as to reach maximum possible economy of the latter and minimum possible losses of sulphur in the slags.

*Example 1*

A sulphur paste is obtained on the filter from a plant for removing hydrogen sulphide from coke oven gas and contains sulphur aqueous liquid in a 1 to 1 proportion, as well as 1% by weight arsenic as potassium arsenite, arsenate and mono-thio-arsenate.

This paste is admixed with a mixture of ferric and ferrous hydroxide in a quantity of 2% by weight, that is in a proportion of 2 parts hydroxide to 1 part arsenic, the paste being thereupon homogenized. After transferring the paste to a melting apparatus embodying a stationary filtering basket the temperature in the apparatus is raised to 135° during one hour. 78.10% sulphur is recovered as filtrate and contains 25 parts per million only $As_2O_3$, the slags left in the basket containing 21.90% of the sulphur with a content of 1.48% $As_2O_3$.

*Example 2*

The process is carried out as in Example 1; however, the sulphur paste from the absorption plant is previously washed with hot water.

The recovery is in this case 86.5% molten sulphur with a content of 20 parts per million $As_2O_3$, the slags in the basket containing 1.8% $As_2O_3$.

*Example 3*

The process is carried out as described in Example 1; however, the temperature is raised to 180° during 30 minutes only, molten sulphur being separated by centrifuging. The recovery is 93.5% molten sulphur containing 20 parts per million $As_2O_3$, the slags left behind in the basket containing 2.30% $As_2O_3$.

*Example 4*

The process is carried out as described in Example 1; however, the hydroxide addition is raised to 5 parts by weight to 1 part arsenic. 73.2% molten sulphur containing less than 20 parts per million $As_2O_3$ is recovered as filtrate, the slags left behind in the basket containing 1.65% $As_2O_3$.

*Example 5*

The process is carried out as described in Example 2, and calcium and magnesium hydroxides and decolorating earths are employed by various proportions. The results are listed in the following table.

| Purifying substances | Recovered sulphur percentage | $As_2O_3$ in the filtered sulphur, p.p.m. |
|---|---|---|
| Ca(OH)$_2$, 20 p./p | 78 | 80 |
| Mg(OH)$_2$, 2 p./p | 80 | 500 |
| Mg(OH)$_2$, 20 p./p | 78 | 20 |
| Decolorating earths, 2 p./p | 81 | 400 |
| Decolorating earths, 20 p./p | 77 | 140 |
| Silica-gel, 20 p./p | 80 | 180 |

What I claim is:

1. A method for recovering substantially pure sulphur from an aqueous paste of elemental sulphur obtained in an oxidative process of absorbing hydrogen sulphide from a gaseous mixture by means of an aqueous absorbing solution containing arsenical compounds, which comprises the steps of mixing the sulphur paste with a substance selected from the group consisting of ferric hydroxide, ferrous hydroxide, calcium hydroxide, magnesium hydroxide, silica gel and decolorating earths, heating the resulting mixture to a temperature of at least 135° C. thereby to separate aqueous liquid from the paste and melt the liquid-freed sulphur whereby an arsenic-rich slag is formed, and separating the molten sulphur from the slag.

2. A method for recovering substantially pure sulphur from an aqueous paste of elemental sulphur obtained in an oxidative process of absorbing hydrogen sulphide from a gaseous mixture by means of an aqueous absorbing solution containing arsenical compounds, which comprises the steps of mixing the sulphur paste with a substance selected from the group consisting of ferric hydroxide, ferrous hydroxide, calcium hydroxide, magnesium hydroxide, silica gel and decolorating earths, in a proportion of 1 to 20 weight-parts substance per part of arsenic in the paste, heating the resulting mixture to a temperature of at least 135° C., thereby to separate aqueous liquid from the paste and melt the liquid-freed sulphur, whereby an arsenic-rich slag is formed, and separating the molten sulphur from the slag.

3. A method for recovering substantially pure sulphur from an aqueous paste of elemental sulphur obtained in an oxidative process of absorbing hydrogen sulphide from a gaseous mixture by means of an aqueous absorbing solution containing arsenical compounds, which comprises the steps of mixing the sulphur paste with a substance selected from the group consisting of ferric hydroxide, ferrous hydroxide, calcium hydroxide, magnesium hydroxide, silica gel and decoloring earths, in finely subdivided form in a proportion of 1 to 20 weight-parts substance per part of arsenic in the paste, heating the resulting mixture to a temperature of at least 135° C., thereby to separate aqueous liquid from the paste and melt the liquid-freed sulphur, whereby an arsenic-rich slag is formed, and separating the molten sulphur from the slag.

4. A method for recovering substantially pure sulphur from an aqueous paste of elemental sulphur obtained in an oxidative process of absorbing hydrogen sulphide from a gaseous mixture by means of an aqeous absorbing solution containing arsenical compounds, which comprises the steps of mixing the sulphur paste with a substance selected from the group consisting of ferric hydroxide, ferrous hydroxide, calcium hydroxide, magnesium hydroxide, silica gel and decolorating earths, heating the resulting mixture to a temperature between 135° and 145° C., thereby to separate aqueous liquid from the paste and melt the liquid-freed sulphur, whereby an arsenic-rich slag is formed, and separating the molten sulphur from the slag.

5. A method of recovering substantially pure sulphur from an aqeous paste of elemental sulphur obtained in an oxidative process of absorbing hydrogen sulphide from a gaseous mixture by means of an aqueous absorbing solution containing arsenical compounds, which comprises the steps of mixing the sulphur paste with at least one part by weight of iron hydroxide per part by weight of arsenic in the paste, heating the resulting aqueous mixture to a temperature of at least 135° C., thereby to separate aqueous liquid from the paste and melt the liquid-freed sulphur, whereby an arsenic-rich slag is formed, and separating the molten sulphur from the slag.

6. A method of recovering substantially pure sulphur from an aqeous paste of elemental sulphur obtained in an oxidative process of absorbing hydrogen sulphide from a gaseous mixture by means of an aqueous absorbing solution containing arsenical compounds wherein the sulphur paste is washed with water, which comprises the steps of mixing the washed paste with at least one part by weight of iron hydroxide per part by weight of arsenic in the paste, heating the resulting aqueous mixture to a temperature of at least 135° C., thereby to separate aqueous liquid from the paste and melt the liquid-freed sulphur, whereby an arsenic-rich slag is formed, and separating the molten sulphur from the slag.

References Cited in the file of this patent

UNITED STATES PATENTS

| 1,719,762 | Gollman | July 2, 1929 |
| 1,932,812 | Carvlin | Oct. 31, 1933 |
| 1,970,147 | Levy | Aug. 14, 1934 |
| 2,002,365 | Eymann | May 21, 1935 |
| 2,767,062 | Duecker | Oct. 16, 1956 |
| 2,943,910 | Giammarco | July 5, 1960 |